US012650543B2

(12) United States Patent
    Zhang

(10) Patent No.: US 12,650,543 B2
(45) Date of Patent: Jun. 9, 2026

(54) DISPLAY FILM AND DISPLAY ASSEMBLY

(71) Applicant: BEIJING ZENITHNANO TECHNOLOGY CO., LTD., Beijing (CN)

(72) Inventor: Yuchun Zhang, Beijing (CN)

(73) Assignee: Beijing Zenithnano Technology Co., Ltd., Beijing (CN)

( * ) Notice: Subject to any disclaimer, the term of this patent is extended or adjusted under 35 U.S.C. 154(b) by 1016 days.

(21) Appl. No.: 17/716,778

(22) Filed: Apr. 8, 2022

(65) Prior Publication Data

US 2023/0003925 A1      Jan. 5, 2023

Related U.S. Application Data

(63) Continuation of application No. PCT/CN2021/124272, filed on Oct. 17, 2021.

(30) Foreign Application Priority Data

Jul. 4, 2021      (CN) .......................... 202110754045.8

(51) Int. Cl.
    *G02B 5/08*      (2006.01)
    *G02B 1/10*      (2015.01)
(52) U.S. Cl.
    CPC ................. *G02B 5/08* (2013.01); *G02B 1/10* (2013.01); *B60K 2360/27* (2024.01)
(58) Field of Classification Search
    CPC ......... G02B 5/08; G02B 1/10; B60K 2360/27
    See application file for complete search history.

(56) References Cited

U.S. PATENT DOCUMENTS

| | | | |
|---|---|---|---|
| 5,523,132 A | 6/1996 | Zhang et al. | |
| 10,437,054 B2 | 10/2019 | Tso et al. | |
| 10,845,512 B2 | 11/2020 | Vikor et al. | |
| 2007/0188871 A1 | 8/2007 | Fleury et al. | |
| 2011/0262742 A1 | 10/2011 | Takeuchi et al. | |
| 2018/0180776 A1 | 6/2018 | Vikor et al. | |
| 2018/0292587 A1 | 10/2018 | Kawamoto et al. | |

(Continued)

FOREIGN PATENT DOCUMENTS

| | | |
|---|---|---|
| AU | 2014223560 A1 | 10/2015 |
| CN | 103029371 A | 4/2013 |
| CN | 103073196 A | 5/2013 |

(Continued)

OTHER PUBLICATIONS

PCT International Search Report, PCT Application No. PCT/CN2021/124272, filed Oct. 17, 2021.

(Continued)

*Primary Examiner* — Wen Huang
(74) *Attorney, Agent, or Firm* — Quarles & Brady LLP

(57)      ABSTRACT

The present disclosure provides a display film. The display film includes a substrate and a film stack provided on the substrate, wherein the film stack sequentially includes: a first high-refractive-index layer, a transflective coating layer and a second high-refractive-index layer; and the transflective coating layer is made of at least one metal and an oxide of the metal, or at least one metal and a nitride of the metal, or at least one metal and a nitride and an oxide of the metal. The present disclosure further provides a display assembly using the display film. The display assembly of the present disclosure can display projected information.

22 Claims, 8 Drawing Sheets

(56) References Cited

U.S. PATENT DOCUMENTS

2019/0064516 A1    2/2019  Wagner et al.

FOREIGN PATENT DOCUMENTS

| CN | 104267499 A | 1/2015 |
|---|---|---|
| CN | 106019424 A | 10/2016 |
| CN | 108369368 A | 8/2018 |
| CN | 110392674 A | 10/2019 |
| CN | 111164492 A | 5/2020 |
| CN | 111446024 A | 7/2020 |
| CN | 113320248 A | 8/2021 |
| GB | 9928967 | 2/2000 |

OTHER PUBLICATIONS

Chinese Office Action issued Mar. 31, 2023. Chinese Application No. 202110754045.8.
Chinese Search Report issued Mar. 27, 2023. Chinese Application No. 202110754045.8.
Article Received: Feb. 28, 2019 | Accepted: Apr. 2, 2019 | Web Released: May 22, 2019; "Preparation and Characterization of Novel Preimidized Semi-alicyclicPolyimide Alignment Layers with Low Curing Temperature and High Voltage Holding Ratio for TFT-LCDs"; Chem. Lett. 2019, 48, 654-657 | doi:10.1246/cl. 190117; © 2019 The Chemical Society of Japan.
"Preparation and Characterization of Novel Preimidized Semi-alicyclic Polyimide Alignment Layers with Low Curing Temperature and High Voltage Holding Ratio for TFT-LCDs"; | Accepted: Apr. 2, 2019 | Web Released: May 22, 2019.

30

40

DISPLAY FILM AND DISPLAY ASSEMBLY

CROSS-REFERENCE TO RELATED APPLICATIONS

This application is the continuation of International Application No. PCT/CN2021/124272, filed Oct. 17, 2021, which claims priority to Chinese Patent Application No. 202110754045.8 entitled "DISPLAY FILM AND DISPLAY ASSEMBLY" filed Jul. 4, 2021, the contents of both applications are expressly incorporated herein by reference in its entirety.

TECHNICAL FIELD

The present disclosure relates to the field of projection display, and in particular to a vehicle projection display film and display assembly.

BACKGROUND

Automobiles are becoming increasingly popular, but the instrument panel of a vehicle is generally arranged under the steering wheel, which obliges the driver to lower his/her head to view the driving information, and poses a safety hazard to the driver and other vehicles or pedestrians on the road. In view of this, the head-up display (HUD) comes into being, which allows the driver to view the vehicle driving information without diverting from the usual viewpoint.

SUMMARY

The present disclosure provides display films and display assemblies for a head-up display (HUD). The present disclosure can transmit the light outside a vehicle and reflect the projected information inside the vehicle so as to provide vehicle driving information without affecting the sight outside the vehicle.

The display film provided by the present disclosure includes a substrate and a film stack provided on the substrate, where the film stack at least sequentially includes: a first high-refractive-index layer, a transflective coating layer, and a second high-refractive-index layer; and the transflective coating layer is made of at least one metal and an oxide of the metal, or at least one metal and a nitride of the metal, or at least one metal and a nitride and an oxide of the metal.

In an aspect, the at least one metal may include Ag, Cu, Al, Mo, an Ag alloy, a Cu alloy, an Al alloy, or a Mo alloy; the Ag alloy may include greater than 50 wt % of Ag, the Cu alloy may include greater than 50 wt % of Cu, the Al alloy may include greater than 80 wt % of Al, and the Mo alloy may include greater than 80 wt % of Mo; preferably, the Ag alloy further may include one or more from the group consisting of Zn, Cu, In, Pt, Pd, Au, Nb, Nd, B, Bi, and Ni; the Cu alloy further may include one or more from the group consisting of Zn, Ag, In, Pt, Pd, Au, Nb, Nd, B, Bi, and Ni; the Mo alloy further may include one or more from the group consisting of Zn, Cu, In, Pt, Pd, Au, Nb, Nd, B, Bi and Ni; and the Al alloy layer further may include one or more from the group consisting of Zn, Cu, In, Pt, Pd, Au, Nb, Nd, B, Bi, and Ni.

In another aspect, the first high-refractive-index layer and/or the second high-refractive-index layer may have a refractive index of 1.8-2.4, and may be made of one or more materials selected from the group consisting of an oxide, a nitride, a sulfide, a fluoride and a carbide of a metal or non-metal; specifically, the first high-refractive-index layer and/or the second high-refractive-index layer may be made of one or more materials selected from the group consisting of $TiO_2$, $SnO_2$, $ZnO$, $Nb_2O_5$, $Ta_2O_5$, $Si_3N_4$, $ZnS$, $Al_2O_3$, $MgF$, $MgS$ and $SiC$; and the metal or non-metal further may include a dopant, which may include one or more materials selected from the group consisting of Al, Ga, Zr, B, Y, Mo, and Sn.

In another aspect, the display film further may include a weather-resistant layer provided between the first high-refractive-index layer and the transflective coating layer; the weather-resistant layer may be made of one or more materials selected from the group consisting of a non-metal oxide, a non-metal nitride, a metal sulfide, a metal nitride, and a metal oxide; preferably, the weather-resistant layer may be made of one or more materials selected from the group consisting of TiN, ZnO, $TiO_2$, $SnO_2$, $SiO_2$, $Si_3N_4$, $ZnS$, $Al_2O_3$ and $MoO_2$; and the weather-resistant layer further may include a dopant, which may include an oxide or a nitride of one or more from the group consisting of Al, Ga, Zr, B, Y, Mo, and Sn.

In another aspect, the display film further may include an anti-oxidation layer provided between the transflective coating layer and the second high-refractive-index layer. In some embodiments, the anti-oxidation layer may be made of one material selected from the group consisting of a metal, an alloy, a metal oxide, a metal nitride, a non-metal oxide, and a non-metal nitride. According to some embodiments, the anti-oxidation layer may be made of one material selected from the group consisting of Ti, Ni, Cr, NiCr, TiN, ZnO, $TiO_2$, $SnO_2$, $SiO_2$, $Nb_2O_5$, $Ta_2O_5$, and $Si_3N_4$.

In another aspect, the transflective coating layer may have a thickness of 5-40 nm.

In another aspect, the first high-refractive-index layer and/or the second high-refractive-index layer may have a thickness of 2-200 nm.

In another aspect, the weather-resistant layer may have a thickness of 2-200 nm.

In another aspect, the anti-oxidation layer may have a thickness of 0.5-10 nm.

In yet another aspect, the substrate may be made of polyvinyl butyral (PVB) or polyethylene terephthalate (PET), and a surface of the substrate in contact with the film stack may be a smooth surface.

The display assembly provided by the present disclosure includes a first glass, a second glass. and the aforementioned display film, where the display film is provided between the first glass and the second glass; and the display assembly further includes PVB film provided on a side away from the substrate of the display film.

In yet another aspect, a side of the film stack away from the substrate may define an incident side; and the display assembly may have a reflectivity of 5-40% in case of an incident angle of 55-75° and a reflectivity of 20-35% in case of an incident angle of 60-70° .

The display film and display assembly provided by the present disclosure can provide vehicle driving information through projection without affecting the sight outside the vehicle.

REFERENCE NUMERALS

Figure 1:
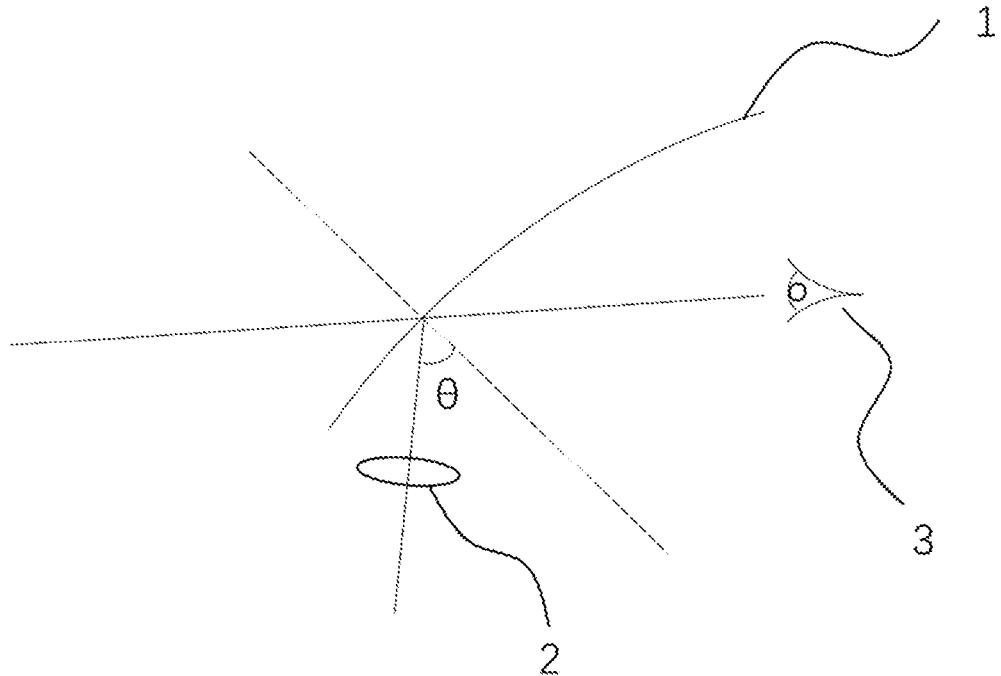
FIG. 1 is a schematic diagram of a display assembly in operation according to the present disclosure.

1. display assembly; 2. projection device; 3. observer; 10. glass; 20. glass; 30. adhesive layer; 40. substrate; 100. film stack; 110. first high-refractive-index layer; 120. weather-resistant layer; 130. transflective coating layer; 140. anti-oxidation layer; and 150. second high-refractive layer.

DETAILED DESCRIPTION OF THE EMBODIMENTS

The foregoing and other technical contents, features, and effects of the present disclosure will be clearly presented in the following detailed description of preferred embodiments in conjunction with the drawings. The directional terms mentioned in the following embodiments, such as top, bottom, left, right, front and rear, are only used to indicate the directions shown in the drawings. Therefore, the directional terms used herein are intended to illustrate rather than limit the present disclosure. The present disclosure will be further described in detail below with reference to the drawings.

FIG. 1 is a schematic diagram of a display assembly 1 in operation according to an embodiment of the present disclosure. As shown in FIG. 1, in this embodiment, display assembly 1 is a front windshield of a vehicle. A projection device 2 projects vehicle driving information onto the display assembly 1 at a certain incident angle, and a part of light is reflected to the eyes of an observer 3. According to the display assembly of the present disclosure, when projection device 2 is incident at an incident angle 0 of 55-75° , a reflectivity of the display assembly 1 is 5-40%. When the incident angle θ of the projection device 2 is 60-70° , the reflectivity of the display assembly 1 is 20-35%. In this way, the display assembly 1 can clearly reflect the vehicle driving information to the eyes of the observer 3. If the reflectivity is too low and the reflected light is too weak, the observer cannot see the driving information of the vehicle. If the reflectivity is too large, the reflected light of the projection device 2 will be too bright, which will affect the normal sight of the observer.

Figure 2:
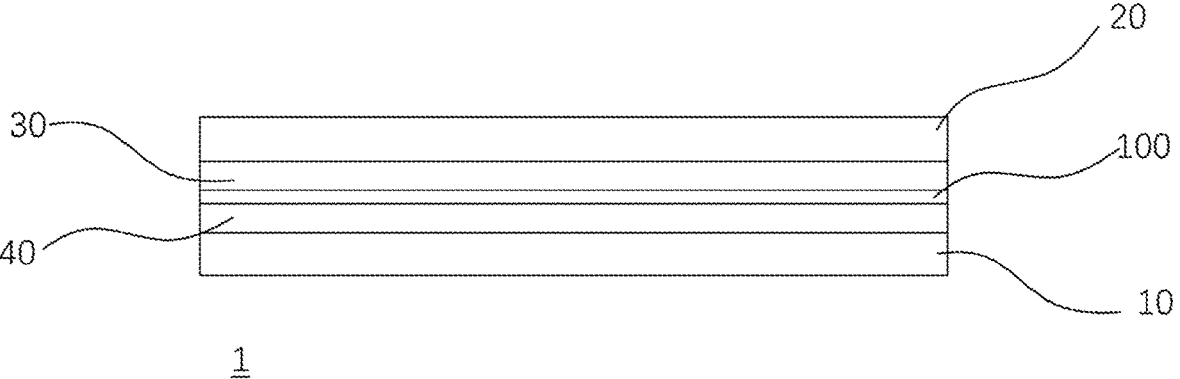
FIG. 2 is a structural diagram of the display assembly according to the present disclosure.
Figure 7:
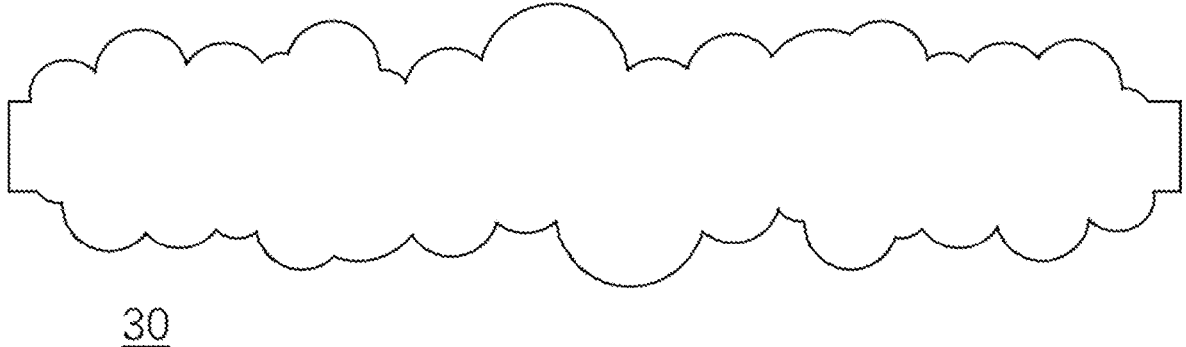
FIG. 7 is a structural diagram of an adhesive layer shown in FIG. 2.
Figure 8:
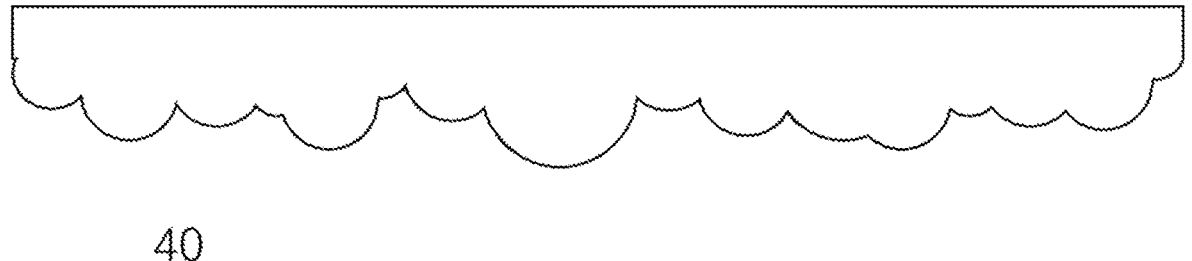
FIG. 8 is a structural diagram of a substrate of the display film, shown in FIG. 3.

FIG. 2 is a structural diagram of the display assembly 1 according to an embodiment of the present disclosure. The display assembly 1 includes glass 10/20, a display film, and an adhesive layer 30. The display film includes a substrate 40 and a film stack 100. The substrate 40 may be made of PET or PVB, and the adhesive layer 30 may be made of PVB. A surface of the substrate 40 in contact with the film stack 100 is a smooth surface. FIG. 7 is a schematic diagram of an implementation of the adhesive layer 30. The adhesive layer 30 has a rough surface with a shrinkage ratio of greater than 4 in a machine direction (MD) or transverse direction (TD). FIG. 8 is a schematic diagram of an implementation of the substrate 40. When the substrate 40 is made of PET, an adhesive layer is further provided between the substrate 40 and the glass 10. The adhesive layer may be made of PVB (not shown in the figure). When the substrate 40 is made of PVB, a surface of the substrate in contact with the film stack 100 is a smooth surface with a roughness Ra less than 8 nm, and substrate 40 has a shrinkage ratio (MD/TD) less than 2. The substrate 40 is in direct contact with the glass 10. An incident side of the projection light of the projection device 2 is defined as a side of the film stack 100 away from the substrate 40. As shown in FIG. 2, the incident side is the side where the glass 20 is located.

Figure 3:
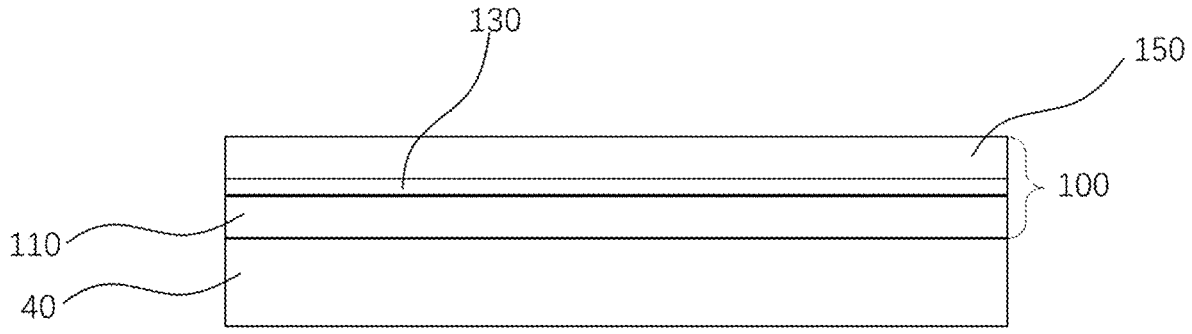
FIG. 3 is a structural diagram of a display film, shown in FIG. 2, according to an embodiment of the present disclosure.

FIG. 3 is a structural diagram of a display film according to an embodiment of the present disclosure. The display film includes a substrate 40 and a film stack 100. In this embodiment, the film stack 100 includes a first high-refractive-index layer 110, a transflective coating layer 130 and a second high-refractive-index layer 150. The first high-refractive-index layer 110, the transflective coating layer 130 and the second high-refractive-index layer 150 may all be formed by means of physical vapor deposition (PVD). The first high-refractive-index layer 110 and the second high-refractive-index layer 150 each have a refractive index of 1.8-2.4 and a thickness of 2-200 nm. The first high-refractive-index layer 110 and the second high-refractive-index layer 150 each is made of one or more materials selected from the group consisting of an oxide, a nitride, a sulfide, a fluoride, and a carbide of a metal or non-metal. For example, first high-refractive-index layer 110 and second high-refractive-index layer 150 each may comprise one or more materials selected from the group consisting of $TiO_2$, $SnO_2$, ZnO, $Nb_2O_5$, $Ta_2O_5$, $Si_3N_4$, ZnS, $Al_2O_3$, MgF, MgS and SiC. In addition, the first high-refractive-index layer 110 and the second high-refractive-index layer 150 further include a dopant, which includes one or more from the group consisting of Al, Ga, Zr, B, Y, Mo, and Sn. When the high-refractive-index layers are formed by a PVD process, the dopant may react with a reactive gas to form AZO, GZO, and YZO. This is for example only, and other products may be produced depending on the dopant and the reactive gas.

The transflective coating layer 130 is a layer in which a metal and an oxide or a nitride of the metal coexist, and has a thickness of 5-40 nm. Specifically, the transflective coating layer is made of at least one metal and an oxide of the metal, or at least one metal and a nitride of the metal, or at least one metal and a nitride and an oxide of the metal. When the transflective coating layer is formed, a metal target is used for the PVD process. A small amount of oxygen or nitrogen or a mixture of oxygen and nitrogen is introduced into a reaction chamber. Since the gas introduced is very little, it is not enough to completely oxidize or nitride the metal material, so the formed coating layer is a layer in which metal and metal oxide and/or metal nitride coexist. The metal target may be Ag, Cu, Al, Mo, an Ag alloy, a Cu alloy, an Al alloy, or a Mo alloy. The Ag alloy target includes greater than 50 wt % of Ag, and the Ag alloy target further includes one or more materials selected from the group consisting of Zn, Cu, In, Pt, Pd, Au, Nb, Nd, B, Bi, and Ni. The Cu alloy target includes greater than 50 wt % of Cu, and the Cu alloy target further includes one or more materials selected from the group consisting of Zn, Ag, In, Pt, Pd, Au, Nb, Nd, B, Bi, and Ni. The Al alloy target includes greater than 80 wt % of Al, and the Al alloy target further includes one or more materials selected from the group consisting of Zn, Cu, In, Pt, Pd, Au, Nb, Nd, B, Bi, and Ni. The Mo alloy target includes greater than 80 wt % of Mo, and the Mo alloy target further includes one or more from the group consisting of Zn, Cu, In, Pt, Pd, Au, Nb, Nd, B, Bi, and Ni.

Figure 4:
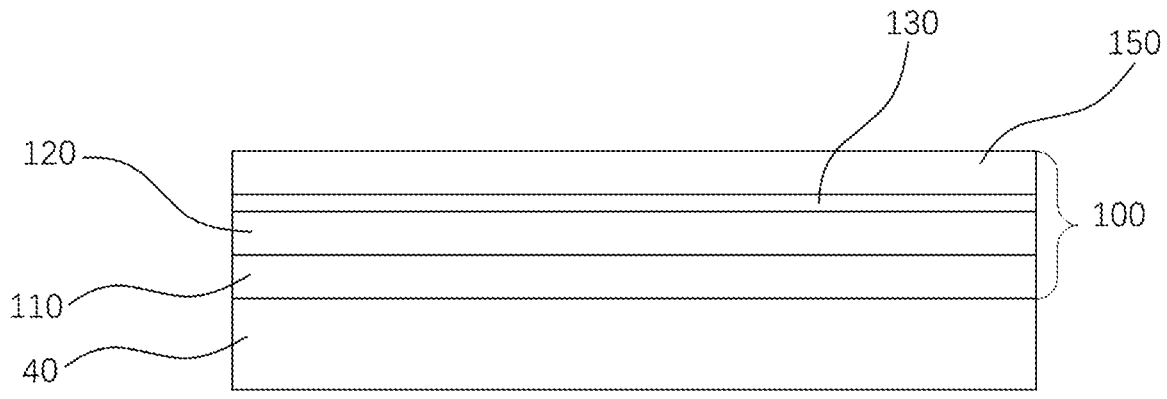
FIG. 4 is a structural diagram of the display film, shown in FIG. 2, according to another embodiment of the present disclosure.

FIG. 4 is a structural diagram of a display film according to another embodiment of the present disclosure. The structures shown in the figure with the same reference numerals as those shown in FIG. 3 are the same structures, which will not be repeated here. The difference from FIG. 3 is that a weather-resistant layer 120 is further provided between the first high-refractive-index layer 110 and the transflective coating layer 130, and the weather-resistant layer 120 has a thickness of 2-200 nm. The weather-resistant layer 120 is made of one or more materials selected from the group consisting of a non-metal oxide, a non-metal nitride, a metal sulfide, a metal nitride, and a metal oxide. Specifically, it may be made of a material selected from the group consisting of TiN, ZnO, $TiO_2$, $SnO_2$, $SiO_2$, $Si_3N_4$, ZnS, $Al_2O_3$, and $MoO_2$. The weather-resistant layer 120 further includes a dopant, which may specifically include an oxide and/or a nitride of one or more from the group consisting of Al, Ga, Zr, B, Y, Mo, and Sn.

Figure 5:
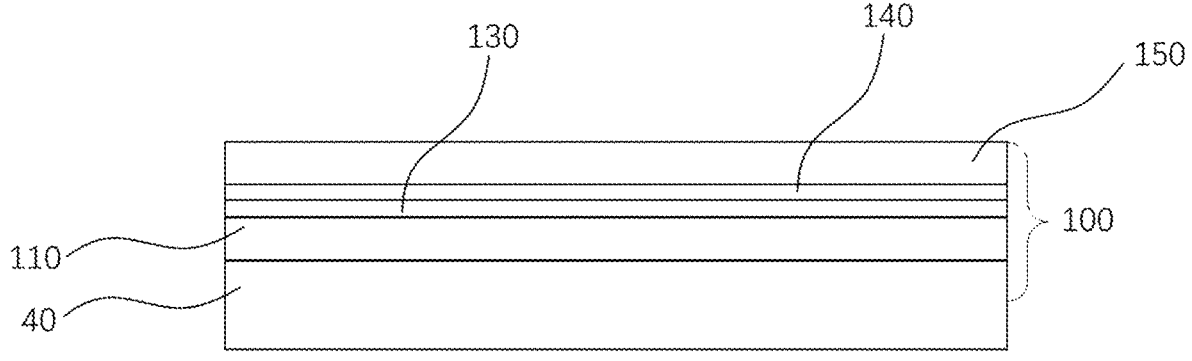
FIG. 5 is a structural diagram of the display film, shown in FIG. 2, according to another embodiment of the present disclosure.

FIG. 5 is a structural diagram of a display film according to another embodiment of the present disclosure. The structures shown in the figure with the same reference numerals as those shown in FIG. 3 are the same structures, which will not be repeated here. The difference from FIG. 3 is that an anti-oxidation layer 140 is further provided between the transflective coating layer 130 and the second high-refractive-index layer 150, and the anti-oxidation layer 140 has a thickness of 0.5-10 nm. The anti-oxidation layer 140 is made of a material selected from the group consisting of a metal, an alloy, a metal oxide, a metal nitride, a non-metal oxide, and a non-metal nitride. Specifically, the anti-oxidation layer 140 is made of one or more from the group consisting of Ti, Ni, Cr, NiCr, TiN, ZnO, $TiO_2$, $SnO_2$, $SiO_2$, $Nb_2O_5$, $Ta_2O_5$, and $Si_3N_4$. When the anti-oxidation layer 140 is a metal layer or an alloy material layer, it has a thickness of 0.5-3 nm, and it is formed by an atomic vapor deposition (AVD) process or a PVD process. When the anti-oxidation layer 140 is a metal or non-metal oxide or nitride, it has a thickness of 1-10 nm, and it is formed by an AVD process or a PVD process.

Figure 6:
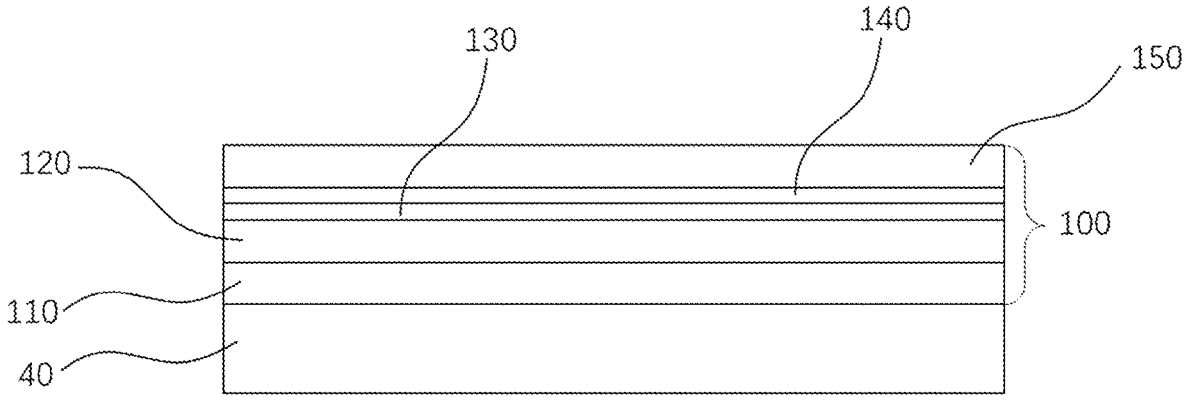
FIG. 6 is a structural diagram of the display film, shown in FIG. 2, according to another embodiment of the present disclosure.

FIG. 6 is a structural diagram of a display film according to another embodiment of the present disclosure. The structures shown in the figure with the same reference numerals as those shown in FIG. 4 are the same structures, which will not be repeated here. The difference from FIG. 4 is that an anti-oxidation layer 140 is further provided between the transflective coating layer 130 and the second high-refractive-index layer 150. The structure of the anti-oxidation layer 140 may be referred to that of the anti-oxidation layer in FIG. 5, which will not be repeated here.

The present disclosure tests the relevant implementations through the following embodiments to obtain the technical effects of different implementations. Table 1 shows the structure of the film stacks in each embodiment, and each column of the table provides the materials and thicknesses of the film stacks.

TABLE 1

|  | First high-refractive-index layer 110 | Weather-resistant layer 120 | Transflective coating layer 130 | Anti-oxidation layer 140 | Second high-refractive-index layer 150 |
|---|---|---|---|---|---|
| Embodiment 1 | ZnO-40 nm | | Al + AlO-6 nm | | ZnO-45 nm |
| Embodiment 2 | SIN-38 nm | | Ag + AgO-12 nm | | ITO |
| Embodiment 3 | $Nb_2O_5$-32 nm | ZnO-5 nm | CuNi + CuNiN-8 nm | | ZnO-50 m |
| Embodiment 4 | $TiO_2$-32 nm | $SnO_2$-10 nm | Ag-In + AgInN-15 nm | | $Nb_2O_5$-40 nm |
| Embodiment 5 | $SnO_2$-50 nm | SIN-2 nm | AlTi + AlTiO-5 nm | NiCr-0.5 nm | $TiO_2$-50 nm |
| Embodiment 6 | IZO-50 nm | SIN-2 nm | AgZn + AhZnO-20 nm | SiN-1 nm | IZO-50 nm |
| Embodiment 7 | $TiO_2$-40 nm | ZnO-5 nm | Al+AlO-5 nm | NiCr-1 nm | IZO-50 nm |

Display assemblies were fabricated according to the above embodiments, and the reflectivity and transmittance of the display assemblies at different incident angles θ were tested, as shown in Table 2. The weather resistance was subsequently tested, and the test results are shown in Table 3. The weather resistance includes: high-temperature and high-humidity reliability: 85° C. and 85% relative humidity (RH) for 1,000 h; 3,000 h QUV reliability: ultraviolet (UV) irradiation on the coating surface [UV-A, 340 nm, 0.71 $W/(m^2 * nm)$, 60° C.] for 4 h, and storage for 4 h (50° C.), 100% RH, continuous spraying; and 1,000 h thermal shock reliability: alternating shocks for 60 min at −40° C. and 60 min at 80° C. The changes in appearance, color Δd transmittance were observed.

TABLE 2

| Incident | 0° | | 65°, P-polarized light | | 65°, S-polarized light | |
|---|---|---|---|---|---|---|
| angle θ | Transmittance | Reflectivity | Transmittance | Reflectivity | Transmittance | Reflectivity |
| Embodiment 1 | 84.2 | 5.8 | 75.4 | 20.2 | 70.4 | 25.4 |
| Embodiment 2 | 83.7 | 6.7 | 73.8 | 22.1 | 66.4 | 26.8 |
| Embodiment 3 | 86.5 | 5.1 | 69.4 | 26.8 | 62.8 | 31.2 |
| Embodiment 4 | 83.5 | 6.2 | 70.4 | 25.1 | 64.2 | 30.4 |
| Embodiment 5 | 85.4 | 5.6 | 72.4 | 23.4 | 65.4 | 27.6 |
| Embodiment 6 | 85.7 | 5.4 | 67.5 | 28.1 | 61.2 | 33.6 |
| Embodiment 7 | 86.5 | 6.7 | 74 | 22 | 66 | 29 |

TABLE 3

| Weather resistance | | High temperature and high humidity (1,000 h) | Thermal shock (1,000 h) | QUV (3,000 h) |
|---|---|---|---|---|
| Embodiment 1 | Appearance | OK | OK | OK |
| | ΔE | 0.7 | 0.5 | 1.2 |
| | Transmittance change | 1.02 | 1.03 | 1.04 |
| Embodiment 2 | Appearance | OK | OK | OK |
| | ΔE | 0.6 | 0.4 | E4 |
| | Transmittance change | 1.01 | E04 | E06 |
| Embodiment 3 | Appearance | OK | OK | OK |
| | ΔE | 0.8 | 0.9 | EO |
| | Transmittance change | 1.05 | E06 | E02 |
| Embodiment 4 | Appearance | OK | OK | OK |
| | ΔE | 0.8 | 0.3 | E3 |
| | Transmittance change | E04 | E02 | E06 |
| Embodiment 5 | Appearance | OK | OK | OK |
| | ΔE | 0.3 | 0.7 | El |
| | Transmittance change | E04 | E05 | 1.02 |
| Embodiment 6 | Appearance | OK | OK | OK |
| | ΔE | 0.5 | 0.4 | 1.5 |
| | Transmittance change | E02 | E03 | 1.03 |
| Embodiment 7 | Appearance | OK | OK | OK |
| | ΔE | 0.6 | 0.4 | 1.3 |
| | Transmittance change | E04 | E03 | 1.05 |

9
10

The above are only the preferred embodiments of the present disclosure, and thus the scope of the present disclosure is not limited thereto. Equivalent changes and modifications made in accordance with the claims and specifications of the present disclosure should fall within the patent scope of the present disclosure. In addition, it is not necessary for any embodiment or claim of the present disclosure to achieve all of the objectives or advantages, or features of the present disclosure. The abstract and title are only used to aid in the retrieval of the patent document and are not intended to limit the scope of the claims of the present disclosure. In addition, terms such as "first" and "second" mentioned in this specification or the claims are only used to name the elements or to distinguish different embodiments or ranges, rather than to limit the upper or lower limit of the number of elements.

What is claimed is:

1. A display film, comprising:
a substrate; and
a film stack provided on the substrate, the film comprising:
a first high-refractive-index layer characterized by a first refractive index of 1.8 to 2.4;
a transflective coating layer coupled to the first high-refractive-index layer; and
a second high-refractive-index layer coupled to the first high-refractive-index layer, the second high-refractive-index layer being characterized by a second refractive index of 1.8 to 2.4;
wherein the transflective coating layer is a single layer comprising at least one metal material and a metal oxide material and/or a metal nitride material, and wherein the metal material coexists with the metal oxide material or the metal nitride material within the single layer.

2. The display film according to claim 1, wherein the at least one metal material comprises Ag, Cu, Al, Mo, an Ag alloy, a Cu alloy, an Al alloy or a Mo alloy.

3. The display film according to claim 2, wherein:
the Ag alloy comprises greater than 50 wt % of Ag;
the Cu alloy comprises greater than 50 wt % of Cu;
the Al alloy comprises greater than 80 wt % of Al; and
the Mo alloy comprises greater than 80 wt % of Mo.

4. The display film according to claim 3, wherein:
the Ag alloy further comprises one or more materials selected from a group consisting of Zn, Cu, In, Pt, Pd, Au, Nb, Nd, B, Bi, Ni and Ti;
the Cu alloy further comprises one or more materials selected from a group consisting of Zn, Ag, In, Pt, Pd, Au, Nb, Nd, B, Bi, Ni and Ti;
the Mo alloy further comprises one or more materials selected from a group consisting of Zn, Cu, In, Pt, Pd, Au, Nb, Nd, B, Bi, Ni and Ti; and
the Al alloy layer further comprises one or more materials selected from a group consisting of Zn, Cu, In, Pt, Pd, Au, Nb, Nd, B, Bi, Ni and Ti.

5. The display film according to claim 1, wherein the first high-refractive-index layer and/or the second high-refractive-index layer is made of one or more materials selected from a group consisting of an oxide, a nitride, a sulfide, a fluoride and a carbide of a metal or non-metal.

6. The display film according to claim 5, wherein the metal or non-metal further comprises a dopant, and the dopant comprises one or more materials selected from a group consisting of Al, Ga, Zr, B, Y, Mo and Sn.

7. The display film according to claim 5, wherein the first high-refractive-index layer and/or the second high-refractive-index layer is made of one or more materials selected from a group consisting of $TiO_2$, $SnO_2$, ZnO, $Nb_2O_5$, $Ta_2O_5$, $Si_3N_4$, ZnS, $Al_2O_3$, MgF, MgS and SiC.

8. The display film according to claim 1, wherein the display film further comprises a weather-resistant layer provided between the first high-refractive-index layer and the transflective coating layer.

9. The display film according to claim 8, wherein the weather-resistant layer is made of one or more materials selected from a group consisting of a non-metal oxide, a non-metal nitride, a metal sulfide, a metal nitride and a metal oxide.

10. The display film according to claim 9, wherein the weather-resistant layer is made of one or more materials selected from a group consisting of TiN, ZnO, $TiO_2$, $SnO_2$, $SiO_2$, $Si_3N_4$, ZnS, $Al_2O_3$ and $MoO_2$.

11. The display film according to claim 9, wherein the weather-resistant layer further comprises a dopant, and the dopant comprises an oxide or a nitride of one or more from a group consisting of Al, Ga, Zr, B, Y, Mo and Sn.

12. The display film according to claim 1, wherein the display film further comprises an anti-oxidation layer provided between the transflective coating layer and the second high-refractive-index layer.

13. The display film according to claim 12, wherein the anti-oxidation layer is made of one material selected from a group consisting of a metal, an alloy, a metal oxide, a metal nitride, a non-metal oxide and a non-metal nitride.

14. The display film according to claim 13, wherein the anti-oxidation layer is made of one material selected from a group consisting of Ti, Ni, Cr, NiCr, TIN, ZnO, $TiO_2$, $SnO_2$, $SiO_2$, $Nb_2O_5$, $Ta_2O_5$ and $Si_3N_4$.

15. The display film according to claim 1, wherein the transflective coating layer has a thickness of 5-40 nm.

16. The display film according to claim 1, wherein the first high-refractive-index layer and/or the second high-refractive-index layer has a thickness of 2-200 nm.

17. The display film according to claim 8, wherein the weather-resistant layer has a thickness of 2-200 nm.

18. The display film according to claim 12, wherein the anti-oxidation layer has a thickness of 0.5-10 nm.

19. The display film according to claim 1, characterized in that the substrate is made of polyvinyl butyral (PVB) or polyethylene terephthalate (PET), and a surface of the substrate in contact with the film stack is substantially smooth.

20. A display assembly, comprising:
a first glass;
a second glass; and
a display film according to any one of claims 1-4 and 5-19;
wherein the display film is provided between the first glass and the second glass; and wherein the display assembly further comprises a PVB film provided on a side away from the substrate of the display film.

21. The display assembly according to claim 20, wherein a side of the film stack away from the substrate defines an incident side; and the display assembly has a reflectivity of 15-40% when an incident angle is 55-75°.

22. The display assembly according to claim 21, wherein the display assembly has the reflectivity of 20-35% when the incident angle is 60-70°.

* * * * *